United States Patent [19]

Endo

[11] Patent Number: 5,894,527
[45] Date of Patent: Apr. 13, 1999

[54] SELECTIVELY OUTPUTTING IMAGE INFORMATION OF DIFFERING AMPLIFICATIONS

[75] Inventor: Azuchi Endo, Kanagawa-ken, Japan

[73] Assignee: Fuji Photo Film Co., Ltd., Kanagawa-ken, Japan

[21] Appl. No.: 08/844,953

[22] Filed: Apr. 23, 1997

Related U.S. Application Data

[63] Continuation of application No. 08/456,379, Jun. 1, 1995, abandoned.

[30] Foreign Application Priority Data

Jun. 1, 1994 [JP] Japan .................. 6-120263

[51] Int. Cl.$^6$ ............................... H04N 1/40
[52] U.S. Cl. ............................. 382/299; 358/448
[58] Field of Search ................. 348/216–217, 348/221, 229, 296, 300, 362–364, 707; 358/448, 475; 382/276, 321, 148, 299–300

[56] References Cited

U.S. PATENT DOCUMENTS

| | | | |
|---|---|---|---|
| 4,071,752 | 1/1978 | Manning | 348/217 |
| 4,349,834 | 9/1982 | Tonomura et al. | 358/27 |
| 4,427,996 | 1/1984 | Tamura | 348/364 |
| 4,764,811 | 8/1988 | Bastiaans | 348/28 |
| 4,780,762 | 10/1988 | Nagasaki | 348/235 |
| 4,912,557 | 3/1990 | Faroudja | 358/167 |
| 4,918,515 | 4/1990 | Faroudja | 358/11 |
| 5,307,157 | 4/1994 | Hieda | 348/235 |
| 5,655,061 | 8/1997 | Tse et al. | 382/299 |
| 5,754,710 | 5/1998 | Sekine et al. | 382/300 |

*Primary Examiner*—David K. Moore
*Assistant Examiner*—Stephen Brinich

[57] ABSTRACT

An image reader includes a photoelectric converter which reads light carrying image information, a plurality of amplifiers which amplify the photoelectrically converted image information by different amplification factors, a plurality of A/D converters which respectively convert the plurality of pieces of image information amplified by the amplifiers into digital signals, and a selector which selectively outputs the outputs of the respective A/D converters according to displacement of the image information.

16 Claims, 4 Drawing Sheets

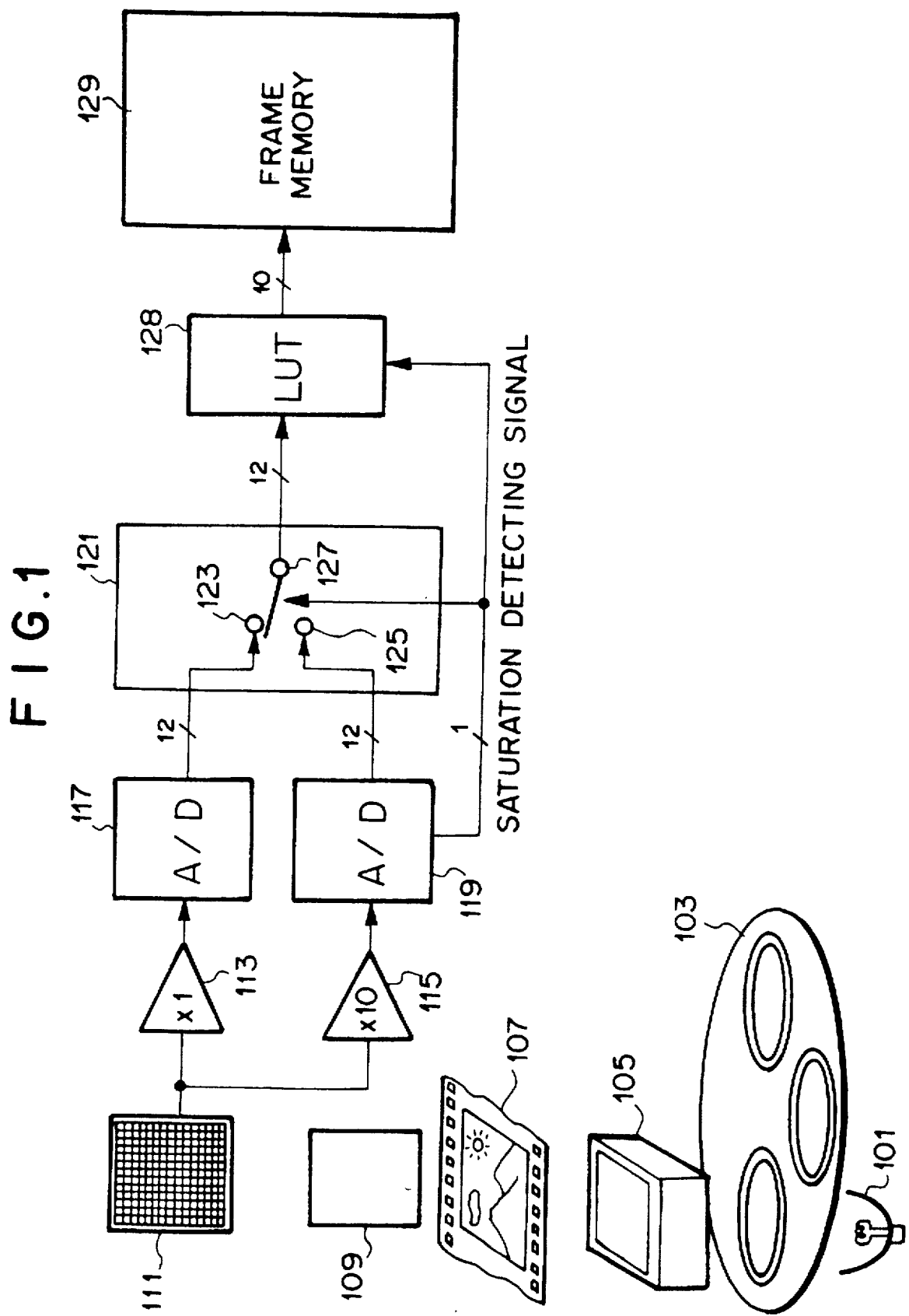

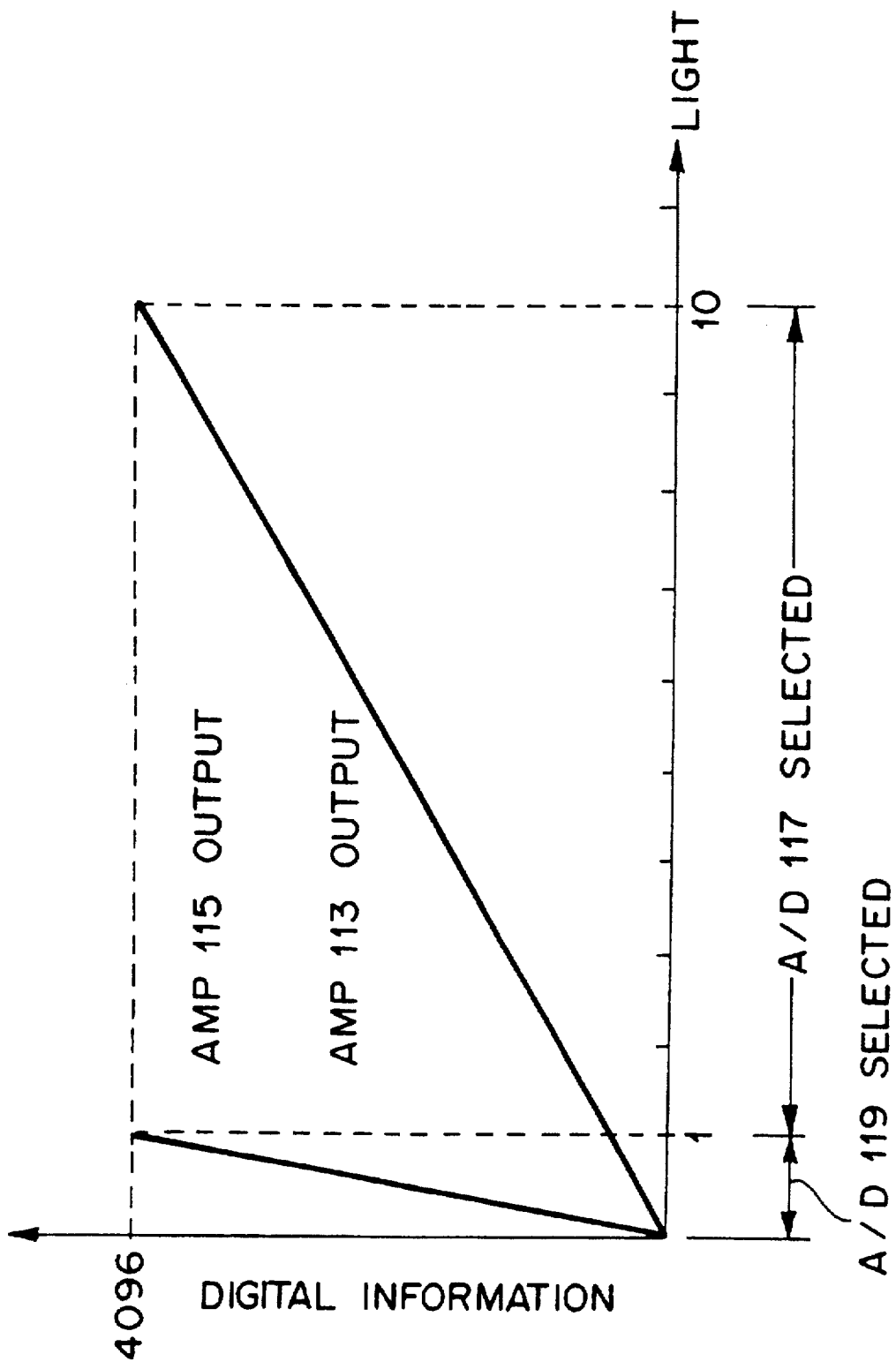

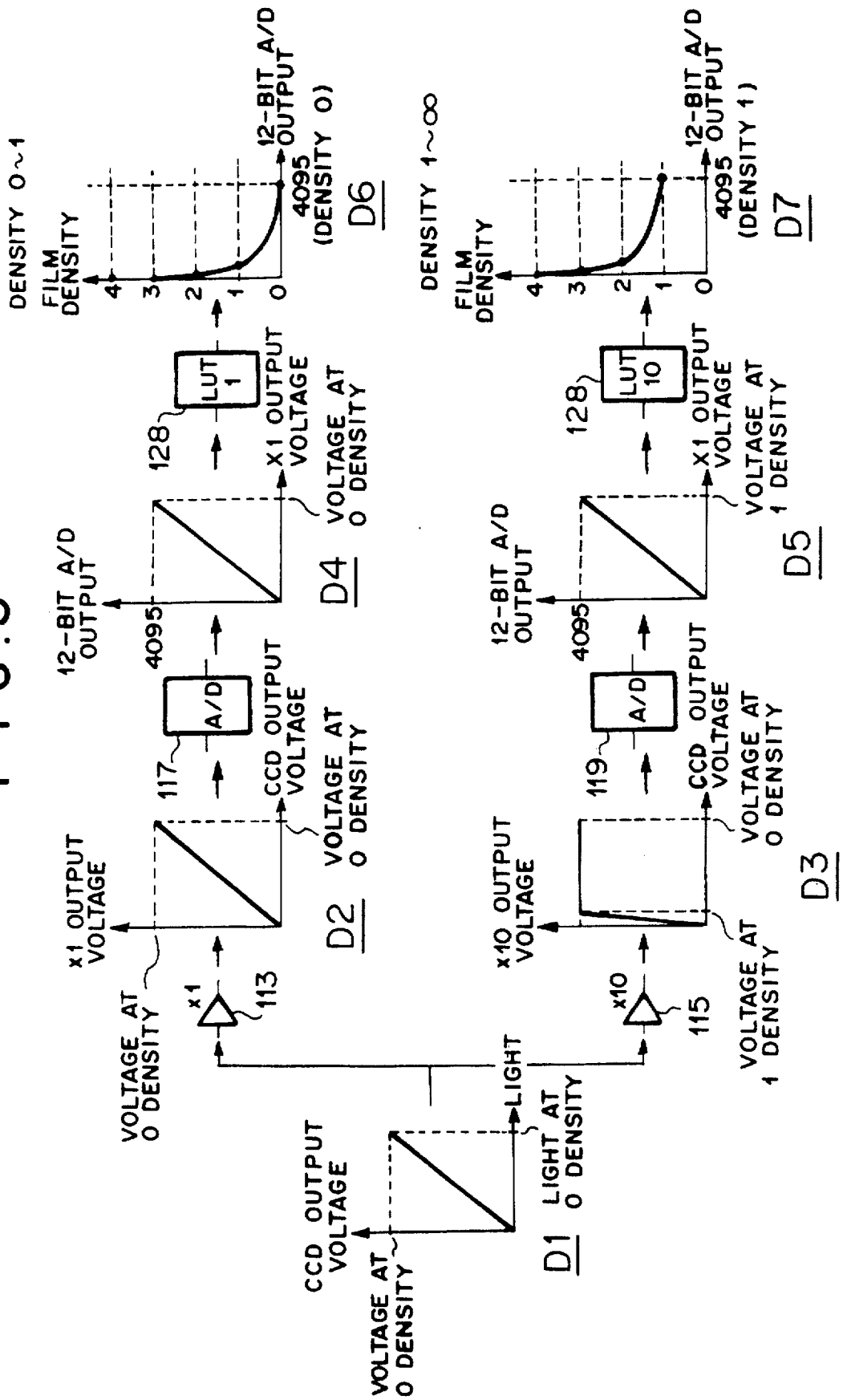

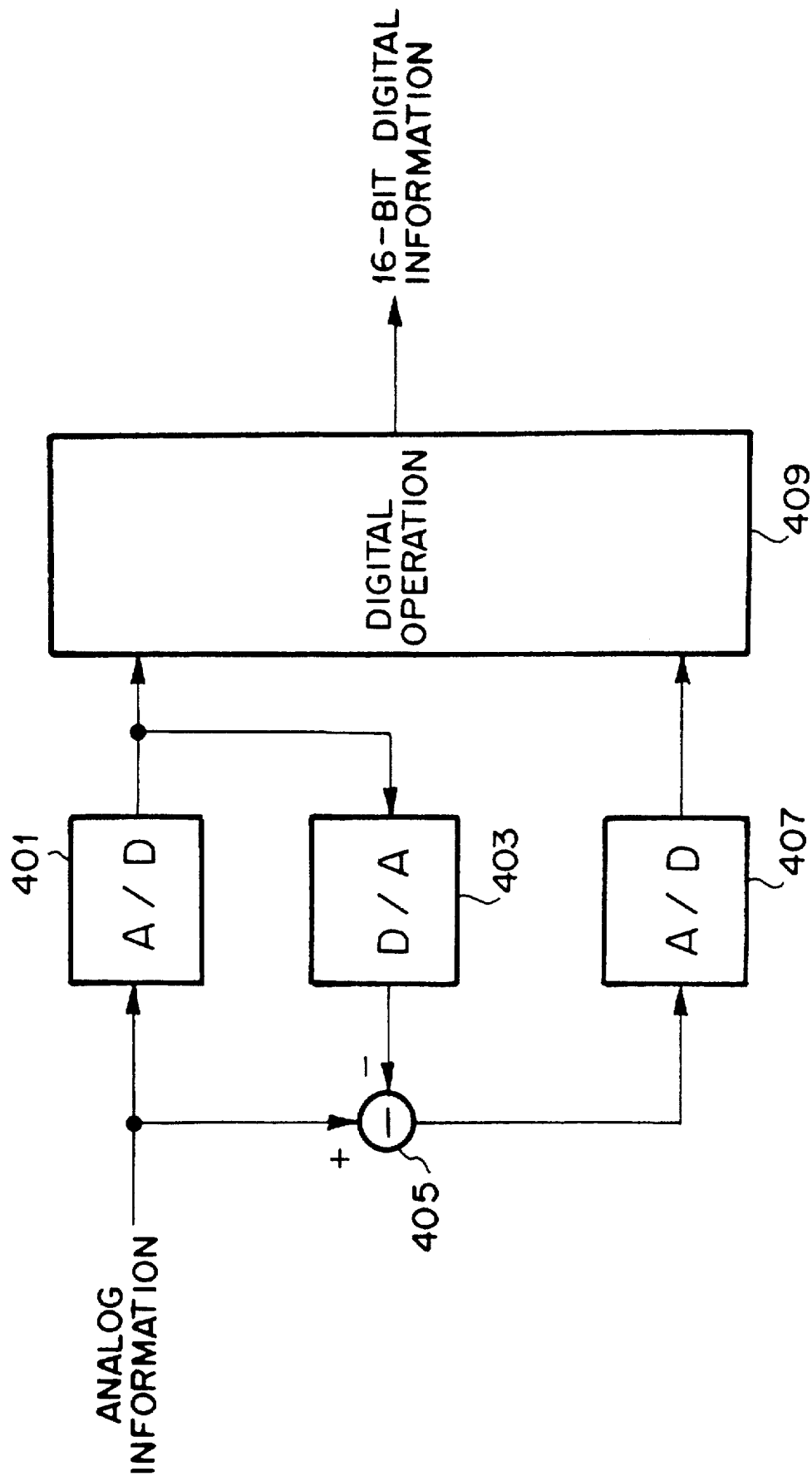

SELECTIVELY OUTPUTTING IMAGE INFORMATION OF DIFFERING AMPLIFICATIONS

This application is a divisional, continuation-in-part, of application Ser. No. 08/456,379 filed on Jun. 1, 1995, now abandoned.

BACKGROUND OF THE INVENTION

1. Field of the Invention

This invention relates to an image reader which reads image information recorded on a reflective original or a transparent original.

2. Description of the Related Art

A digital photoprinter photoelectrically converts image information recorded on a photographic film (e.g., a negative film, a reversal film or the like), printed matter or the like "converts", the read image information to a digital signal, processes the digital signal into image information for recording, and scans a photosensitive recording medium such as photographic paper by a recording light beam modulated according to the image information, thereby printing the image information.

In such a digital photoprinter, editing such as synthesis of a plurality of images or division of an image, editing of layout of printed image including characters and pictures, and various image processings such as adjustment of color and/or density, change of magnification, and emphasis of contour can be freely performed, and accordingly, a finished print freely edited and freely processed as desired can be output.

In the conventional surface exposure printing, all the image density information recorded on a photographic film or the like cannot be reproduced in terms of density resolution, space resolution and color/density reproducibility. However, with the digital photoprinter, a print in which image density information recorded on a film is reproduced substantially one hundred percent can be output.

Such a digital photoprinter generally includes an image reader which reads an image recorded on an original such as a photographic film, a setup system which processes the read image and determines a subsequent exposure condition, and an image forming system which scans a photosensitive medium with a light beam according to the exposure condition determined and develops the photosensitive medium.

In the image reader which reads an image recorded on a photographic film, for instance, a linear reading light beam extending in one direction is projected onto the film and the film is moved in a direction perpendicular to the one direction (or the reading light beam and a photoelectric element are moved in a direction perpendicular to the one direction) so that the reading light beam two-dimensionally scans the film.

Transmitted light which is transmitted through the film and carries thereon information on the image recorded on the film is focused on a light receiving surface of a photoelectric converter element such as a CCD (charge coupled device) line sensor, and the image information is photoelectrically read.

The read image data is amplified and converted to a digital signal, and the digital signal is subjected to various image processings such as compensation for fluctuation in properties of the CCD elements, density conversion, magnification conversion and the like and then transferred to the setup system.

In the setup system, the transferred image information is reproduced as a visible image on a display such as a CRT.

The operator observes the reproduced image and makes required additional correction such as a gradation correction, a color/density correction and the like (setting of a setup condition). If the reproduced image is satisfactory as a finished print, the image data is transferred to the image forming system as an image information for recording.

In an image forming system wherein an image is recorded by raster scan, three light beams corresponding to photosensitive layers sensitive to the three primary colors, e.g., R, G, B, formed on the photosensitive medium are modulated according to the image information for recording and deflected in a main scanning direction (corresponding to the one direction) while the photosensitive medium is being fed in a sub scanning direction substantially perpendicular to the main scanning direction (the reflected light beams and the photosensitive medium are fed in the sub scanning direction relative to each other), whereby the photosensitive medium is two-dimensionally scanned by and exposed to the modulated light beams and the image on the film is recorded on the photosensitive medium.

The exposed photosensitive medium is then subjected to development appropriate for the kind of the photosensitive medium. For example, when the photosensitive medium is of silver-salt type, the exposed medium is subjected to color development, bleaching/fixing, water washing and drying and the output as a finished print.

In order to obtain a high quality finished print with such a digital photoprinter, a photoelectric converter element which is high in both space resolution and density (light intensity) resolution must be used, and, for instance, a CCD sensor is suitably used. The range of density D (log E) of an image which is recorded (or can be recorded) on a negative film is generally about 3.2 and that of an image recorded on a reversal film is about 3.8. Thus, an image having a wide density range can be recorded. In order to obtain image information with high accuracy and to output a high quality finished print, image information of high density resolution up to about 0.01 is necessary.

When image information on a negative film having a density range of 3.0 is read at a resolution of 0.01 using a photoelectric converter element which has a wide density range (dynamic range) and is excellent in both the space resolution and the density resolution, a high performance A/D (analog-to-digital) converter of 16 or more bits is required to quantize the obtained image information.

Such a high performance A/D converter has not been put into practice up to now and would be very expensive even if put into practice.

Accordingly, in conventional image reader employed in the digital photoprinter, the amount of information to be read is limited.

For example, by effecting pre-reading (pre-scan) for roughly reading an image on a film prior to image reading for printing with the dynamic range of the photoelectric converter element held wide and determining the range of density to be read by the CCD sensor, the amount of information to be read can be limited.

However, there is an increasing demand for a high quality finished print and it is necessary to faithfully process high accuracy image information recorded on a photographic film. At present, though it is possible to faithfully read image information on a photographic film, it is difficult to faithfully process the obtained image information at high speed in the stage of quantizing the information.

High accuracy image information can be quantized by using a plurality of A/D converters and effecting analog-to-digital conversion in a plurality of steps. Such an A/D converter system is shown in FIG. 4.

For example, when analog image information is to be converted to 16-bit digital image information, the analog image information is amplified to a desired level and high-order eight bits of the image information are first converted to digital image information by a first A/D converter 401. The digital image information is supplied to a D/A (digital-to-analog) converter 403 and reconverted to analog image information. The analog image information obtained by the reconversion is input into a subtractor 405. The subtractor 405 takes the difference between the original analog image information and the analog image information from the D/A converter 403 corresponding to the high-order eight bits. The difference outputs is input into a second A/D converter 407 and low-order nine bits are converted to digital image information. The digital image information of the high-order eight bits and the digital image information of the low-order nine bits are input into a digital operator 409 and are output from the digital operator 409 as 16-bit image information after subjected to an over-range calculation and the like.

With the 16-bit A/D converter system described above, a dynamic range of 96.3dB can be theoretically ensured and accordingly it is possible to faithfully read image information recorded on a photographic film. However since the A/D converter system is a series-parallel system, the conversion operation becomes complicated and requires a long time as the number of steps increases, whereby mis-code becomes more apt to occur.

SUMMARY OF THE INVENTION

In view of the foregoing observations and description, the primary object of the present invention is to provide an image reader which can faithfully read image information at a high speed with a high resolution.

The image reader in accordance with the present invention comprises a photoelectric converter which reads light carrying thereon image information, a plurality of amplifiers which amplify the photoelectrically converted image information by different amplification factors, a plurality of converter which respectively convert the plurality of pieces of image information amplified by the amplifiers into digital signals, and a selector which selectively outputs the outputs of the respective converter according to displacement of the image information.

In the image reader of this embodiment, light data which carries thereon information on an image recorded on a reflective or transparent original is read by the photoelectric converter and amplified a plurality of amplifiers whose amplification factors differ from each other. The pieces of amplified light data are converted into a like number of pieces of digital data and input into the selector. The selector selectively outputs the pieces of digital data input thereinto according to displacement of the light data.

In order to quantize light data recorded on a photographic film at all the levels thereof, an A/D converter of 16-bit accuracy is required. At present, a high level quantization technique is required to realize such a quantization. Accordingly, in accordance with the present invention, this problem is overcome by providing a plurality of converters according to the displacement (level) of image information taking into account specialty of image information recorded on a photographic film.

That is, in a low level region of the light data, the signal level is amplified and quantization is performed, and in a high level region of the light data, quantization is performed with the signal level held at the original level or amplified by an amplification factor smaller than that by which the signal level is amplified in the low level region of the light data.

Accordingly, a desired resolution can be ensured when performing quantization in the low level region of the light data where a high resolution is required, and at the same time, quantization can be realized by combination of A/D converters having low resolution.

Switching operation of the selector is effected when a converter having a lower saturation power is saturated, or when that the displacement of the light data output from the photoelectric converter exceeds a predetermined level is detected.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

FIG. 1 is a schematic view showing an image reader in accordance with an embodiment of the present invention, FIG. 2 is a view for illustrating the operation of the selector shown in FIG. 1, FIG. 3 is a view showing flow of data obtained in each block shown in FIG. 1, and FIG. 4 is a view showing a conventional A/D conversion.

DESCRIPTION OF THE PREFERRED EMBODIMENT

In FIG. 1, light from a light source 101 travels through an RGB filter 103, is diffused by a diffusion box 105 into homogeneous light, and impinges upon a photographic film 107, which may be a negative film or a reversal film. Image light passing through the film 107 is focused on a two-dimensional CCD 111 by a lens 109.

The CCD 111 reads an image recorded on the film 107 in a scanning fashion with a high space resolution (e.g., about 2000 pixels ×3000 lines in the case of 35 mm film) and a high density resolution. Image reading is performed for each of three primary colors, e.g., R, G, B, and the image is read by measuring the amount of light of each color through photoelectric conversion. The light data obtained by the CCD 111 are input into first and second amplifiers 113 and 115.

The first amplifier 113 amplifies the light data by an amplification factor of one and inputs the amplified light data into a first A/D converter 117. The second amplifier 115 amplifies the light data by an amplification factor of ten and inputs the amplified light data into a second A/D converter 119.

Though the density range recordable on a negative film is generally 0.1 to 3.2, reading a density width of 2.0 suffices when an optimal readout density range is determined by pre-scan or the like. Further, in order to read an image with a high accuracy, the density width must be read at a density resolution of 0.01.

That is, in order to read information recorded on a negative film, a density range of not narrower than 2.0 must be read at a density resolution of not lower than 0.01. In this particular embodiment, the A/D converters 117 and 119 respectively converts the amplified light data to 12-bit digital signals and outputs them to fixed ends 123 and 125 of a selector 121.

By amplifying the light data from the CCD 111 by different amplification factors as described above, the resolution limits (saturated resolutions) of the first and second A/D converters 117 and 119 are made to be different from each other. Though the ratio of the amplification factor of the first A/D converter 117 to that of the second A/D converter 119 is 1:10 in this embodiment, the ratio is determined according to the S/N ratio and the dynamic range required for image reading and need not be limited to the value.

A 1-bit saturation detecting signal which informs that the second A/D converter 117 lower in saturated resolution has been saturated or is about to be saturated is supplied to the selector 121 from the second A/D converter 119. The selector 121 selectively outputs the digital image information from the second A/D converter 119 in a state where the resolution of the light data is low and the second A/D converter has not been saturated and selectively outputs the digital image information from the first A/D converter 117 when that the second A/D converter 119 has been saturated is detected.

The operation of the selector 121 will be described with reference to FIG. 2, hereinbelow. FIG. 2 shows the timing of selection by the selector 121, and the vertical axis and the transverse axis respectively show the digital image information output and the relative amount of light. As shown in FIG. 2, when the level of the amount of light is lower than one, the image information which has been amplified by ×10 and converted to a digital signal is selected, and when the level of the amount of light is not lower than one and lower than ten, the image information which has been amplified by ×1 and converted to a digital signal is selected.

When the image information is converted to a digital signal in the manner described above, though the resolution becomes high in the range where the level of the amount of light is low and becomes low in the range where the level of the amount of light is high, it does not give rise to a problem in view of the specialty of image information recorded on a photographic film.

Though, in the embodiment described above, the selector 121 selectively outputs the digital image information from the first A/D converter 117 when the second A/D converter 119, which is lower in saturated resolution, has been saturated, the selector 121 may output the digital image information from the first A/D converter 117 before the second A/D converter 119 is saturated.

Further, though in the embodiment described above, the selector 121 is actuated by detecting that the second A/D converter 119, which is lower in saturated resolution, has been saturated, the selector 121 may be operated when that the level of the amount of light is not lower than a predetermined level is detected by watching change in the amount of light on the basis of the image data obtained by the CCD 111.

Again in FIG. 1, the light data output from a movable end 127 of the selector 121 are input into a LUT (reference table) 128. The LUT 128 is a translation table for translating the 12-bit resolution digital output to film density data, and translates the digital output to 10-bit density data on the basis of a predetermined table selected according to the selection by the selector 121 in response to the saturation detecting signal supplied to the control end thereof.

The LUT 128 comprises a memory and the 1-bit saturation detecting signal is connected to an address line of the highest bit of the memory and the 12-bit digital output is connected to address lines of the lower twelve bits of the memory, thereby obtaining 10-bit density data.

The density data selected and output according the density are supplied to a frame memory 129 and density data for one frame are recorded and stored in the frame memory 129.

The density data for one frame stored in the frame memory 129 are supplied, for instance, to the setup system and the image forming system in a digital photoprinter as described above.

The flow of the respective pieces of data obtained in the respective blocks shown in FIG. 1 will be described with reference to FIG. 3, hereinbelow. In FIG. 3, data D1 are obtained by the CCD 111 and the vertical axis and the transverse axis respectively show the output voltage of the CCD 111 and the amount of light. Data D2 and D3 are respectively obtained by the first and second amplifiers 113 and 115 and the vertical axis and the transverse axis respectively show the output voltage of each amplifier and the output voltage of the CCD 111. Data D4 and D5 are respectively obtained by the first and second A/D converters 117 and 119 and the vertical axis and the transverse axis respectively show the output of each A/D converter and the output voltage of the corresponding amplifier. Data D6 and D7 are respectively obtained by the LUT 128 and the vertical axis and the transverse axis respectively show the sensitivity of the film and the output of each A/D converter.

As shown in FIG. 3, the digital outputs of the CCD amplified by different amplification factors of one and ten are respectively converted to a pair of pieces of film density data, and the density data amplified by one are output on the low density side (density 0 to 1) and the density data amplified by ten are output on the high density side (density 1 to ∞)

With this arrangement, a high accuracy A/D conversion can be realized over a wide dynamic range with a necessary S/N ratio ensured, and the dynamic range of an A/D converter can be better used for a given necessary S/N ratio.

Though, in the embodiment described above, the image data are amplified by one and ten in order to ensure a necessary S/N ratio over the entire range, the amplification factors may be changed according to the reading accuracy requirement.

When a sufficient dynamic ranged cannot be obtained by two A/D converters, three or more A/D converters may be used.

Further, in the embodiment described above, a plurality of A/D converters are used and the saturated resolutions of the respective A/D converters are made different from each other by amplifying the light data by amplifiers whose amplification factors differ from each other. However by using an A/D converter having encoders respectively corresponding to R1 and R2 for R, G1 and G2 for G and Bi and B2 for B, the saturated resolutions of the encoders for coding the respective colors may be made different from each other.

Otherwise by dividing the scanning lines of the two-dimensional CCD into even lines and odd lines, the pieces of image data for the even lines and the odd lines may be converted to digital signals with the saturated resolutions for the respective pieces of image data set different from each other.

Further instead of switching the A/D converters, the outputs of a plurality of A/D converters may be differently weighted and summed up.

Though, in the embodiment described above, a two-dimensional CCD is used as the photoelectric converter means, a one-dimensional CCD may be used. Further various known photoelectric converter means such as a photomultiplier may be used without limiting to CCDs.

As can be understood from the description above, in accordance with the present invention, by selectively outputting the outputs of a plurality of A/D converters according to displacement of the light data which is image information, digital image information having a wide dynamic range can be obtained with a desired S/N ratio ensured. Accordingly image information can be faithfully read with high accuracy without using an A/D converter of a high resolution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image reader for reading and quantizing image information, comprising:

a photoelectric converter which reads light carrying, image information and outputs photoelectrically converted image information;

at least two image information signal paths connected to said photoelectric converter, each of said two signal paths commonly receiving said photoelectrically converted image information from said photoelectric converter and which translate said photoelectrically converted image information at different signal resolutions;

respective digital converters in said signal paths which digitize the image information different quantization levels; and a signal path selector which selectively outputs the signal level of the respective digital converters according to the level of the image information output from said photoelectric converter, said selector outputting the signal level of a one of said converters when the signal level of said image information in one said signal paths is at a first signal level and then outputting the signal level of the other of said converters when said signal level of said image information in the other of said signal paths is at a second signal level, whereby the resolution of an image read from said carrier is improved.

2. The image reader according to claim 1, wherein said first converter has a lower resolution than said second converter.

3. An image reader according to claim 1 wherein said first signal level is below a saturation signal level and said second signal level is above said saturation signal level.

4. An image reader according to claim 3 wherein said image information in said one signal path is amplified by a predetermined gain factor.

5. An image reader according to claim 3 wherein the image information in said one signal path is amplified and the image information in said other signal path is unamplified.

6. An image reader according to claim 3 wherein said one signal path, at least, includes an amplifier.

7. An image reader according to claim 6 wherein said amplifier has a gain greater than one and equal to or less than 10.

8. An image reader according to claim 7 and wherein said other signal path includes a unity gain amplifier.

9. An image reader according to claim 8 wherein said two signal paths are connected in parallel between said photoelectric converter and said selector.

10. An image reader according to claim 9 and wherein said amplifiers are connected in series to the respective digital converters.

11. A method of reading image information from light carrying image information from an image carrier in a photoprinter system comprising the steps of:

photoelectrically converting image information from the light image information and outputting photoelectrically converted image information;

commonly feeding the same said photoelectrically converted image information to each of a plurality of signal paths having mutually different signal gains and where the signal gain in one of said signal paths of said plurality of signal paths is greater than the signal gain in one other signal path of said plurality of signal paths;

digitally quantizing the image information in each of said signal paths in respective converters; and selectively outputting an output of said one signal path when the signal level of said image information is at a first signal level and then outputting an output of said one other signal path when the signal level of said image information is at a second signal level.

12. The method of claim 11, wherein saturation of the first converter indicates displacement of image information.

13. A method according to claim 11 wherein said first level is below the saturation level of the converter in said one signal path and wherein said second level is at or above the saturation level of the converter in said one signal path.

14. An image reader reading and quantizing image information comprising:

a photo-electric converter reading an image and converting the image into image information including image density information;

a first information signal path receiving said image information and quantizing said information to form a first digital image information signal of a first resolution;

a second information signal path receiving said image information and quantizing said information to form a second digital image information signal of a second resolution different than said first resolution; and a signal path selector responsive to the level of said density information for selecting between said first and second digital image information signals output from respective said first and second information signal paths so that one of said first and second digital image information signals is selected when said image information has a density greater than a selected threshold and the other of said digital image information signals is otherwise selected.

15. The image reader according to claim 14 wherein said image information is red, green or blue image information.

16. The image reader according to claim 14 wherein said first resolution is greater than said second resolution, said first information signal path being selected by said selector when said density of said image information is less than a predetermined threshold, to thereby enhance the resolution of low density portions of said image information.

* * * * *